US005780985A

United States Patent [19]

Bickley et al.

[11] Patent Number: 5,780,985

[45] Date of Patent: Jul. 14, 1998

[54] DEFORMABLE SYSTEM

[75] Inventors: Alan Charles Bickley; Laurence John Parnham, both of Huntingdon; John Nicholas Hall, Peterborough, all of United Kingdom

[73] Assignee: The Standard Products Company, Cleveland, Ohio

[21] Appl. No.: 785,302

[22] Filed: Jan. 22, 1997

Related U.S. Application Data

[63] Continuation of Ser. No. 413,543, Mar. 30, 1995, abandoned.

[30] Foreign Application Priority Data

| | | | |
|---|---|---|---|
| Mar. 31, 1904 | [GB] | United Kingdom | 9406485 |
| Jul. 4, 1994 | [GB] | United Kingdom | 9413398 |
| Mar. 17, 1995 | [EP] | European Pat. Off. | 95301792 |

[51] Int. Cl.[6] .......... G05B 5/00

[52] U.S. Cl. .......... 318/460; 318/468; 318/488; 318/282; 49/28

[58] Field of Search .......... 318/280–300, 318/445–489; 49/26–28, 25; 381/86

[56] References Cited

U.S. PATENT DOCUMENTS

| | | | |
|---|---|---|---|
| 4,143,367 | 3/1979 | Schestag | 340/540 |
| 4,200,169 | 4/1980 | MacDonald et al. | 181/131 |
| 4,944,116 | 7/1990 | Mewald | 49/27 |

FOREIGN PATENT DOCUMENTS

| | | |
|---|---|---|
| 0259573A1 | 7/1987 | European Pat. Off. . |
| 0560047A1 | 2/1993 | European Pat. Off. . |
| 2200882 | 4/1974 | France . |
| 2612027 | 9/1988 | France . |
| 3107847A1 | 2/1982 | Germany . |
| 86080644 | 3/1986 | Germany . |
| 59-128009 | 7/1984 | Japan . |
| 60-185626 | 9/1985 | Japan . |
| 2112934 | 7/1983 | United Kingdom . |
| 2236388 | 4/1991 | United Kingdom . |

OTHER PUBLICATIONS

European Search Report, EP 95 30 1792, Jul. 1995.
Great Britain Search Report, GB 9413398.0 Nov. 1994.

*Primary Examiner*—David S. Martin
*Attorney, Agent, or Firm*—Harness, Dickey & Pierce, P.L.C.

[57] ABSTRACT

A deformation detection system including an elongated element having a hollow deformable wall member that defines a radiation transmission path. A sound radiation transmission source positioned at one end of the elongated member transmits acoustical radiation into the radiation transmission path. A sound radiation detector positioned at an opposite end of the radiation transmission path is responsive to and detects the acoustical radiation transmitted from the radiation source. Deformation of the wall member at least partially interrupts the radiation transmission path such that transmitted acoustical radiation from the sound radiation source is attenuated, and the attenuated acoustical radiation is detected and assessed by the radiation detector. The detection system has particular applicability to monitor a body opening of a motor vehicle in which a closure member, such as a window, is movable towards a peripheral edge of the body to close the opening by an electrically operated drive mechanism. A detected attenuated acoustic radiation signal provides a signal to the drive mechanism to stop movement of the closure member.

11 Claims, 2 Drawing Sheets

DEFORMABLE SYSTEM

This is a continuation of U.S. patent application Ser. No. 08/413,543, filed Mar. 30, 1995, now abandoned.

BACKGROUND OF THE INVENTION

1. Field of the Invention

This invention relates to a deformable device intended to assist, for example, in the control of an electrically powered window pane when an object is trapped against an upper sealing member.

2. Background of the Related Art

A number of safety systems have been developed to reduce the possibility of objects being trapped between the top of an upwardly moving window pane and the surround of a vehicle door or the like. Some systems have been developed to monitor the action of the motor with the aim of detecting a trapped body by sensing a change in the current drawn by, or the speed of, a motor powering an electrically operated window pane. These systems have been found to be sensitive to variations in door build and/or environmental conditions and therefore their reliability is poor.

Touch sensors are also known which may be based on many different technologies such as conductive rubber switches, piezo electrical cables, or piezo resistive films. In such cases the sensor is mounted in the upper window or door frame of a vehicle but this method has the drawback that the systems rely on significant squeezing of an obstruction to generate the force required to activate the system. Therefore, the trapped item is subjected to a significant force before it is detected and before the system is activated.

Also, no-touch sensors are known which use an infra-red or optical beam sent from an emitter positioned on the window or door frame and detected by a detector positioned across the window or door opening. Such sensors do not follow the complex curved contour shape of a window or door frame window spacing or the like and therefore may not be activated by a body trapped in the curved portion.

SUMMARY OF THE INVENTION

According to a first aspect of the present invention, there is provided a deformation detection system comprising:

an elongate element including a deformable wall member which defines a radiation transmission path;

a sound radiation transmission source positioned to transmit radiation in the form of audible or inaudible sound waves along the radiation transmission path; and a sound radiation detector positioned to detect the radiation transmitted from said radiation source along the radiation transmission path, which radiation detector is provided with a means for monitoring an attenuation of the radiation;

the arrangement being such that a deformation of the wall member of the elongate element at least partially interrupts the radiation transmission path, whereby radiation being transmitted along the said path to the detector is attenuated.

Thus, the receiver measures a change in magnitude of the signal received.

The term "radiation" as used herein is the process by which energy is emitted from molecules and atoms owing to internal changes, as defined in Websters New International Dictionary (Second Edition).

Preferably, the radiation transmission source transmits continuous radiation. This has the advantage over a pulsed transmission that an improved reaction time is achieved.

Additionally, the system operation is less susceptible to variations in pressure and water vapour content of the air, or other environmental effects. The speed of sound is dependent on such factors, which implies that a pulsed system operating on a "time of flight" system may fail to safe when not necessary. By continuously monitoring the magnitude of the signal, the system is less susceptible to false triggering due to environmental effects.

The detector is preferably capable of producing a signal indicative of the detection of a deformation in the said wall member.

Preferably, the transmitter and/or the receiver are piezoelectric components. Such piezoelectric components are small, robust, cost effective and generally insensitive to the environment. As an example, a suitable material for the transmitter and/or receiver is polyvinylidenefluoride.

The surface of the wall member is preferably capable of reflecting radiation; this permits the radiation transmission path to be curved.

The wall member may be a wall of a bore in the said elongate member, so that the radiation transmission path is defined by the internal surface of the bore. For example, the elongate element may be in the form of a hollow tube. The bore defined by the internal surface conveniently has a circular cross-section, but the cross-section may be any suitable shape, for example oval. In a preferred embodiment, when the bore has a circular cross-section, the internal diameter of the bore is about 4 mm. The internal surface is preferably formed of a highly reflective material. The elongate element is typically formed of EPDM (Ethylene Propylene Diene Monomer).

Typically the detector will detect a clear signal when the elongate element is compressed and the signal passing that portion is decreased. As a portion of the elongate element is compressed the signal passing that portion is decreased. The detector circuit may typically be set up so that it decides a trap has occurred when the received signal has been attenuated to the level which corresponds to a deformation of 50% of the elongate element height at some point along its length.

The radiation transmission path may be divided into two or more sections, operatively linked such that radiation transmitted down one section of the path from a proximal end may be transmitted along the other section of the path towards the radiation detector. For example, where the radiation transmission path is defined by a bore within the elongate element, the bore may be divided into at least two sections linked by, for instance, a reflecting member, or other intervening device capable of receiving and retransmitting the radiation signal from the radiation transmission source. This would enable the two bores to be substantially parallel and would permit the transmission source and the detector to be conveniently positioned substantially adjacent one another at the same end of the bores. In such a case, in a preferred embodiment, one bore may be made stiffer than the other bore. This has advantages of allowing overtravel. Whilst overtravel is not essential, it does allow the peak force experienced during a trap to be reduced.

The transmission source and/or the detector may be positioned at respective ends of the radiation transmission path. When the said path is defined by a bore, each of the transmission source and/or the detector may be in the form of a removable plug, a portion of which can be positioned in the respective end of the bore.

In a preferred embodiment, the elongate element is a window pane sealing member capable of effecting sealing a window opening of a motor vehicle against a window pane.

In this embodiment, the wall member of the elongate element may be deformed under the action of an object trapped between an electrically operated window pane as it closes and the periphery of the window opening about which the sealing member is positioned. On detection of attenuation in the radiation being transmitted along the transmission path, the detector produces a signal indicative of the detection of a deformation in the wall member, and this may be used to control the operation of the window drive or wind mechanism. For instance, the signal may be used to control (e.g. stop or reverse) the action of the motor driving the window. Preferably, the radiation transmission source and radiation detector are energized only when the window pane is closing or attempting to close, and preferably when the window closure is depressed.

Conveniently, the elongate element can be manufactured by extrusion.

According to a second aspect of the present invention, there is provided a motor vehicle having a body opening in which a closure member is movable towards a peripheral edge of the body opening to close the opening, an electrically operated drive mechanism being provided to effect movement of the closure member;

characterised in that said peripheral edge of the body opening is provided with a deformation detection device comprising:

(a) an elongate element including a deformable wall member which defines a radiation transmission path, the arrangement being such that a deformation of the wall member of the elongate element at least partially interrupts the radiation transmission path, whereby radiation being transmitted along the said path to the detector is attenuated;

(b) a sound radiation transmission source positioned to transmit radiation in the form of audible or inaudible sound waves along the radiation transmission path; and (c) a sound radiation detector positioned to detect an attenuation in the radiation transmitted from said radiation source along the radiation transmission path, which radiation detector is provided with a means for monitoring an attenuation of the radiation; and (d) means for controlling operation of said drive mechanism in response to detection by the detection device of the attenuation in the radiation transmitted from the radiation source.

The deformation of the wall member of the elongate element may be as a consequence of an object becoming trapped between the device and the closure member.

The body opening may be a window opening in which case the closure member is a window pane. Alternatively, the body opening may be an opening in the roof of the vehicle (a "sun roof" opening), in which case the closure member is a sun roof member. In either of these cases, the deformable device may be part of a sealing member around the periphery of the body opening.

The drive mechanism may include an electric motor.

The drive mechanism may be controlled in such a way that movement of the closure member is stopped or reversed, so as to prevent the trapped object from being crushed and to permit release of the trapped object. In an alternative embodiment, the drive mechanism can be disabled. Preferably, the radiation transmission source and the radiation detector are only energized when the drive mechanism moves, or attempts to move, the closure member.

As mentioned above, the radiation transmission source may emit audible or inaudible (i.e. ultrasound) sound waves to be detected by the radiation detector. If an audible sound source is used, it may act as a warning that the window pane or closure member is closing. In one embodiment, the note of the audible sound may change to serve as a warning of a trapped object.

Typically, a maximum force of about 10N is exerted on a trapped body with the system of the present invention.

BRIEF DESCRIPTION OF THE DRAWINGS

For a better understanding of the present invention and to show how the same may be carried into effect, reference will now be made, by way of example, to the accompanying drawings, in which.

DESCRIPTION OF THE PREFERRED EMBODIMENTS

Figure 1:
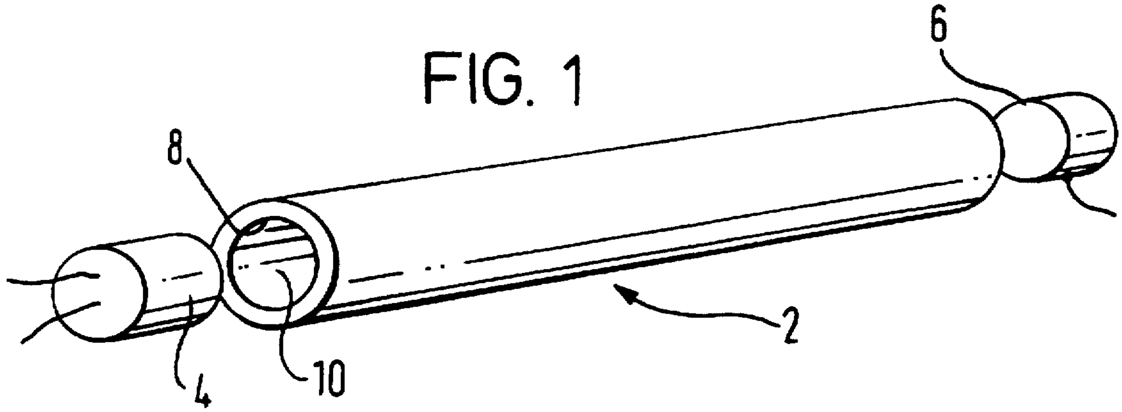
FIG. 1 is a perspective view of one embodiment of the present invention.

Referring firstly to FIG. 1, there is shown a tubular member shown generally at 2, a radiation transmitting source 4 and a radiation detector 6. The tubular member 2 is hollow and has a bore 10 having an internal surface 8 having a highly reflective finish. Radiation is transmitted from the transmitting source 4 to the detector 6 along the bore 10. This is shown in greater detail in FIG. 2. A first radiation beam 12 may be transmitted through the centre of the bore 10 of tubular member 2 without touching the internal surface 8. However, a second radiation beam 14 which is transmitted from the transmitting source 4 does not pass through the central region of the bore 10, but instead hits the internal surface 8 at incident points 16A and 16B. The second radiation beam 14 is reflected by the internal surface 8 at points 16A and 16B due to the high gloss finish. In this way, the second radiation beam 14 may pass down the bore 10 and reaches the detector 6 shown in FIG. 1.

As the tubular member 2 is made of a deformable material, deformation of the tubular member 2 causes deformation of the internal surface 8 and thereby restricts the size of the opening of the bore 10. When the size of the opening of the bore 10 is so restricted, the detector 6 detects attenuated radiation from the transmitting source 4. Whilst it is not shown in the drawings, the detector may be connected to a motor in such a manner that when deformation of the tubular member 2 is detected by detection of attenuated radiation, the motor can be stopped and/or reversed. Therefore, if the motor is controlling an electrically powered window pane, the continued rising of the window pane will be stopped and/or reversed on deformation of tubular member 2.

Figure 2:
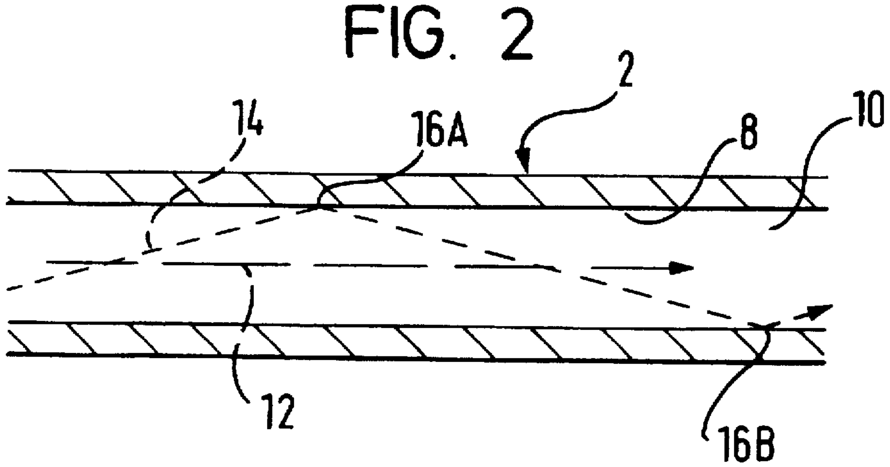
FIG. 2 is a longitudinal sectional view of the embodiment shown in FIG. 1.
Figure 3:
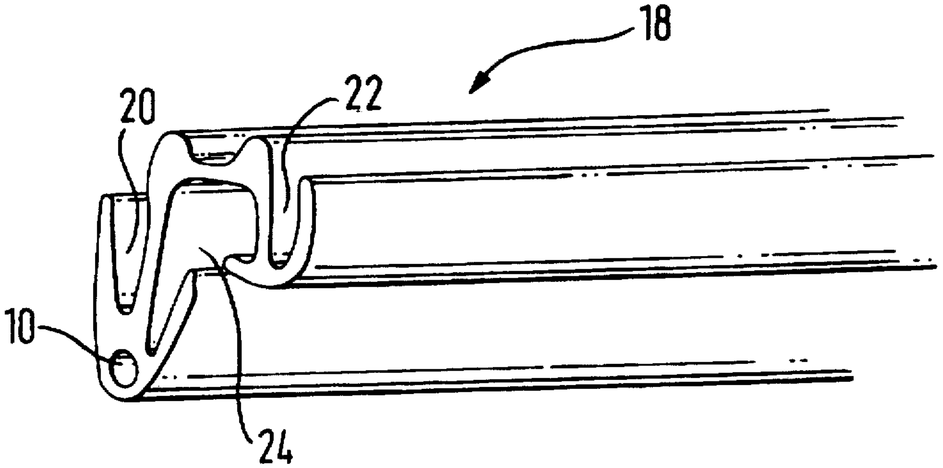
FIG. 3 is a perspective view of another embodiment of the present invention.

Turning now to FIG. 3 there is shown a window sealing member shown generally at 18. The sealing member 18 has a bore 10 of the same form as shown in FIGS. 1 and 2. The sealing member 18 also comprises flange receiving portions 20 and 22, and a glazing panel receiving channel 24. Flange receiving portions 20 and 22 enable attachment of sealing member 18 to, for example, a header portion of a window or door frame joining "A" and "B" pillars of the front door. The glazing panel receiving channel 24 receives a glazing panel (not shown), which is movable in an upward and downward direction, when such a glazing panel is in its fully upward configuration. As discussed in relation to FIGS. 1 and 2 a radiation transmission source and a radiation detecting source can be placed at either end of the bore 10. When a glazing panel moves towards its upward position, a body trapped between it and the sealing member 18 will deform the bore 10 and thereby stop the upward movement of the glazing panel or even reverse that upward movement by detection of attenuated radiation.

Figure 4:
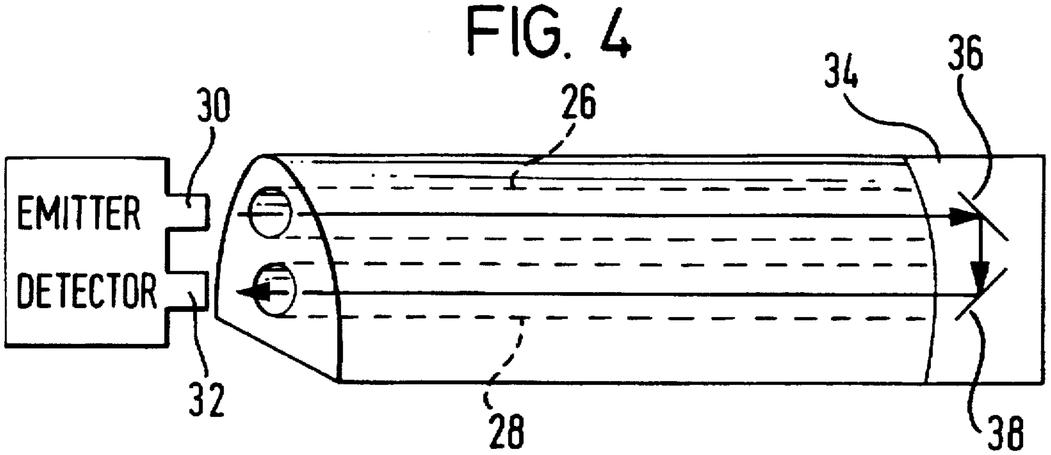
FIG. 4 is a perspective view of yet another embodiment of the present invention.

In a further embodiment shown in FIG. 4, which can also be adapted to be formed in a weatherstrip shown in FIG. 3, there is shown a first bore section 26 and a second bore section 28 running substantially parallel thereto. At one end of the first bore section 26 and second bore section 28 there is positioned a radiation transmitting source 30 and a radiation detector 32 of a form suitable for plugging into a first bore section 26 and second bore section 28, respectively. Plugged into the opposite ends of first bore section 26 and second bore section 28 is a radiation reflecting member 34, the radiation reflecting member 34 comprising two reflecting parts 36, 38. The bore sections 26 and 28 are of the form shown in FIGS. 1 to 3. In use, radiation from the transmitting source 30 travels down the first bore section 26, is reflected by reflecting parts 36 and 38 and is then transmitted along second bore section 28 to the detector. As previously, the detector is able to detect an attenuation in transmitted radiation and thus deformation of one or both of the bore sections 26, 28 and may thereby stop or reverse a motor to which it is connected. The embodiment shown in FIG. 4 allows both the transmitting source 30 and detector 32 to be positioned at one end of the bore sections 26, 28. In a preferred embodiment, one of the bore sections 26 or 28 may be made stiffer than the other bore section. When a body is trapped, the less stiff bore section collapses and attenuates the radiation detected by the detector 32. The stiffer bore section would then deflect at higher loads but may also allow overtravel so that there is sufficient time for the electrical system to which the detector is connected to respond.

Figure 5:
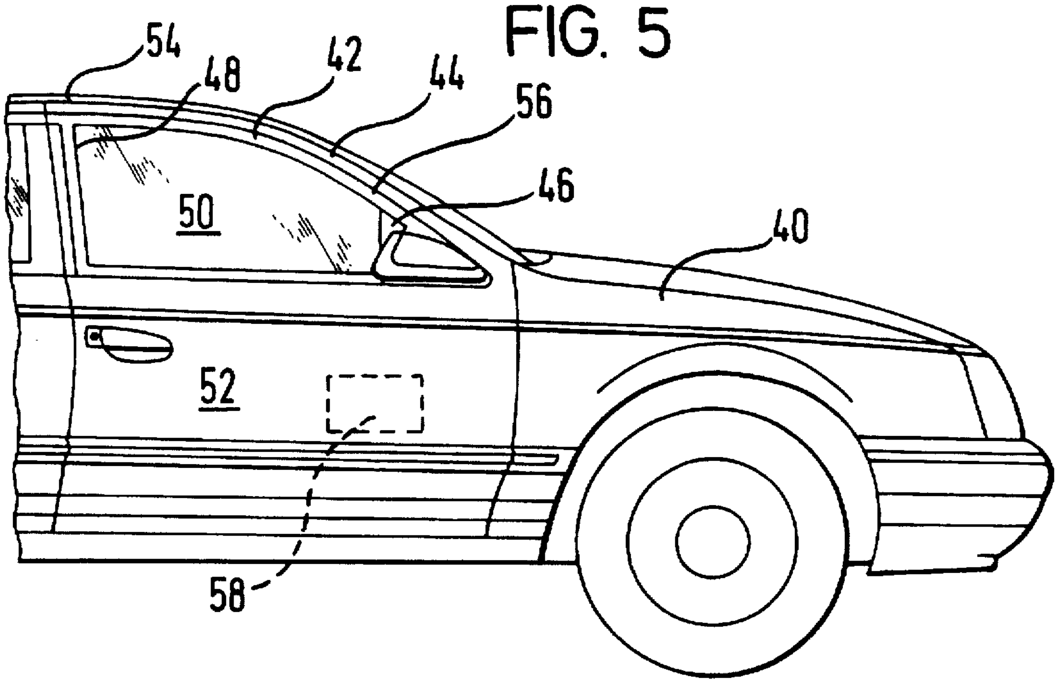
FIG. 5 shows a side view of a vehicle in which the present invention may be used.

FIG. 5 shows a vehicle 40 in which a sealing member 42 is positioned on a header portion 44 connecting "A" pillar 46 and "B" pillar 48. The sealing member 42 is of the form of that shown in FIG. 3, but may be of any suitable form for being positioned on or adjacent the header portion 44. The vehicle 40 has a door 52 within which a window pane 50 is positioned. The window pane 50 is movable in an upward and downward motion within door 52. The sealing member 42 has a bore, as shown in FIG. 3. A radiation transmitter (not shown) is positioned in the region of end 54 of the sealing member 42 and a detector (not shown) in the region of end 56 of the sealing member at the other end of the bore. The detector is connected to a motor 58 which controls the upward and downward motion of the window pane 50. In use, the transmitter transmits a radiation signal along the bore to the detector. As the motor 58 causes the upward motion of the window pane 50, an object trapped between it and sealing member 42 deforms the bore and the detector then detects an attenuated signal from the transmitter and stops the motor 58 which therefore stops the upward movement of window pane 50 preventing significant crushing of the trapped object.

We claim:

1. A deformation detection system comprising:

an elongate element including a deformable wall member which defines an enclosed radiation transmission path that is open to allow transmission of sound waves, said wall member being a wall of a bore in the elongate element, wherein the enclosed radiation transmission path is defined by an internal surface of the bore;

a sound radiation transmission source positioned to transmit radiation in the form of audible or inaudible sound waves along the radiation transmission path, wherein the internal surface of the deformable wall member is made of a highly reflective material along the length of the deformable wall member so as to reduce attenuation of the sound waves traveling through the bore; and a sound radiation detector positioned to detect the radiation transmitted from said radiation source along the radiation transmission path, which radiation detector is provided with a means for monitoring an attenuation of the radiation;

the arrangement being such that a deformation of the wall member of the elongate element at least partially interrupts the radiation transmission path, whereby radiation being transmitted along the said path to the detector is attenuated, wherein the radiation transmission path is divided into two or more sections, operatively linked such that radiation transmitted down one section of the oath from a proximal end may be transmitted along the other section of the path towards the radiation detector, said bore being divided into at least two substantially parallel sections linked by an intervening device capable of receiving and retransmitting the sound waves from the radiation transmission source, said transmission source and detector being positioned substantially adjacent to one another at the same end of the sections, and wherein one bore section is stiffer than the other bore section.

2. A deformation detection system according to claim 1, wherein the radiation transmission source transmits continuous radiation.

3. A deformation detection system according to claim 1, wherein the transmission source and detector are piezoelectric.

4. A deformation detection system according to claim 1, wherein the detector is capable of producing a signal indicative of the detection of a deformation in the said wall member.

5. A deformation detection system according to claim 1, wherein the bore has a circular or oval cross-section.

6. A deformation detection system according to claim 1, wherein the transmission source and/or the detector is in the form of a removable plug, a portion of which is positioned in the respective end of the bore.

7. A deformation detection system according to claim 1, wherein the elongate element is a window pane sealing member capable of effecting sealing a window opening of a motor vehicle against a window pane.

8. A deformation detection system according to claim 7, wherein the wall member of the elongate element is deformed under the action of an object trapped between an electrically operated window pane as it closes and the periphery of the window opening about which the sealing member is positioned.

9. A deformation detection system according to claim 7, wherein, on detection of attenuation in the radiation being transmitted along the transmission path, the detector produces a signal indicative of the detection of a deformation in the wall member, and this is used to control the operation of a window drive or wind mechanism.

10. A deformation detection system according to claim 7, wherein the radiation transmission source and radiation detector are energized only when the window pane is closing or attempting to close.

11. A deformation detection system comprising:

an elongated element including a deformable portion, said deformable portion being separated into a first bore section and a second bore section extending the length of the elongated element, said first and second bore sections being adjacent to each other and defining first and second radiation transmission paths connected to form a continuous radiation transmission path;

a sound radiation transmission source positioned adjacent an opening of one of the first or second or bore sections and transmitting radiation in the form of audible or inaudible sound waves along the first or second radiation transmission path, such that sound waves are reflected at an end of the first or second bore sections opposite to the radiation transmission source into the other of the first or second bore sections; and a sound radiation detector positioned adjacent to a first opening of the other of the first or second bore sections at an end of the elongated member adjacent to the sound radiation transmission source and being responsive to reflected radiation in the other first or second radiation transmission path, said radiation detector including means for monitoring an attenuation of the sound waves, wherein a deformation of the deformable portion of the elongated member at least partially interrupts the first and second radiation transmission paths such that radiation being transmitted along the first and second transmission paths is attenuated, and wherein the stiffness of the first bore section is stiffer than the second bore section so that the radiation in the first bore section is less attenuated than radiation in the second bore section.

* * * * *